United States Patent
Pruski et al.

(10) Patent No.: US 8,216,111 B2
(45) Date of Patent: Jul. 10, 2012

(54) CLUTCH CONTROL FOR A TRANSMISSION

(75) Inventors: Matthew Pruski, Brighton, MI (US);
Gabriel Gibson, Grand Ledge, MI (US);
Steven B. Christ, Farmington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 260 days.

(21) Appl. No.: 12/688,605

(22) Filed: Jan. 15, 2010

(65) Prior Publication Data
US 2011/0177913 A1 Jul. 21, 2011

(51) Int. Cl.
*F16H 61/04* (2006.01)
(52) U.S. Cl. .................. 477/143; 477/154
(58) Field of Classification Search ............ 477/143, 477/154
See application file for complete search history.

(56) References Cited

U.S. PATENT DOCUMENTS

| | | | | |
|---|---|---|---|---|
| 4,517,859 A | * | 5/1985 | Nagaoka et al. | 477/143 |
| 5,879,268 A | * | 3/1999 | Yasue et al. | 477/143 |

* cited by examiner

*Primary Examiner* — Sherry Estremsky

(57) ABSTRACT

A system and method for controlling torque includes a first torque transmitting mechanism and a second torque transmitting mechanism. The first torque transmitting mechanism is engageable to achieve a first gear ratio of the transmission. The second torque transmitting mechanism has an apply chamber that is pressurized at a first pressure level to achieve a first engaged position and is pressurized at a second pressure level to achieve a second engaged position. The first pressure level is less than the second pressure level and the second engaged position achieves a second gear ratio of the transmission. A controller is in communication with the first and second torque transmitting mechanisms. The controller includes a control logic for pressurizing the apply chamber of the second torque transmitting mechanism to the first pressure level if the first operating condition has exceeded a threshold operating condition.

16 Claims, 4 Drawing Sheets

| RANGE | CLUTCH | | | | |
|---|---|---|---|---|---|
| | C1 | C2 | C3 | C4 | C5 |
| 1 | X | | | | X |
| 2 | X | | | X | |
| 3 | X | | X | | |
| 4 | X | X | | | |
| 5 | | X | X | | |
| 6 | | X | | X | |
| R | | | X | | X |
| N | X | | | | |

*Fig-2*

CLUTCH CONTROL FOR A TRANSMISSION

FIELD

The present disclosure relates to a system and method for controlling a transmission, and more particularly to a system and method for reducing an upshift delay in a transmission.

BACKGROUND

The statements in this section merely provide background information related to the present disclosure and may or may not constitute prior art.

Vehicle powertrains typically include a prime mover, such as an internal combustion engine, a transmission and a coupling device that transfers drive torque from the prime mover to the transmission. In some instances, an engine overspeed condition can arise, where an uncontrolled speed flare occurs in the powertrain. In one example, the engine overspeed condition may arise when there is a significant upshift delay during manual shift mode of a manumatic or tap-up tap-down (TUTD) type transmission. The driver may accidentally overspeed the engine while the transmission is in the process of upshifting to the next gear.

Such overspeed conditions can result in damage to engine and transmission components. As a result, an engine overspeed protection control may be provided which reduces an engine torque request when either the engine speed or a transmission input shaft speed is exceeded. However, the engine overspeed protection may cause a drop in torque thereby adversely affecting vehicle performance. This issue can be especially troublesome in high performance vehicles, where drivers usually expect enhanced vehicle characteristics such as high power output and torque.

While current transmission control systems and methods achieve their intended purpose, there is a need for a new and improved transmission control system and method which exhibit improved upshift performance.

SUMMARY

The present invention provides a system for controlling a transmission, where the system includes a first torque transmitting mechanism and a second torque transmitting mechanism. The first torque transmitting mechanism is engageable to achieve a first gear ratio of the transmission. The second torque transmitting mechanism has an apply chamber, where the apply chamber is pressurized at a first pressure level to achieve a first engaged position and is pressurized at a second pressure level to achieve a second engaged position. The first pressure level is less than the second pressure level. The second engaged position achieves a second gear ratio of the transmission.

A controller is in communication with the first and second torque transmitting mechanisms. The controller includes a first control logic for monitoring a first transmission operating condition when the transmission is in the first gear ratio. The controller also includes a second control logic for determining if the transmission operating condition has exceeded a threshold operating condition. The controller includes a third control logic for pressurizing the apply chamber of the second torque transmitting mechanism to the first pressure level if the first operating condition has exceeded the threshold operating condition.

In an embodiment of the present invention, the controller includes a fourth control logic for monitoring the engagement of the first torque transmitting mechanism.

In another embodiment of the present invention, the controller includes a fifth control logic for determining if the first torque transmitting mechanism is disengaged.

In yet another embodiment of the present invention, the controller includes a sixth controller logic for executing program code for pressuring the apply chamber of the second torque transmitting mechanism to the second pressure level if the first torque transmitting mechanism is disengaged.

In another embodiment of the present invention, the controller includes a control logic for a timer. The timer depressurizes the apply chamber of the second torque transmitting mechanism from the first pressure level if a predetermined amount of time has been exceeded and the first torque transmitting device is not disengaged.

In an embodiment of the present invention, the second torque transmitting mechanism includes a return mechanism having a biasing force. The apply chamber exerts a force that is about equal to the biasing force when the apply chamber is pressurized to the first pressure level.

In another embodiment of the present invention, the first pressure level is a base pressure of the apply space that is multiplied by a weighing factor a pressure offset value is added to the product of the base pressure and the weighing factor.

In yet another embodiment of the present invention, the base pressure is a learned value that is calculated during one of a closed throttle downshift and a lift foot upshift of the transmission.

In an embodiment of the present invention, the weighing factor is a calibration value used to scale the base pressure.

In another embodiment of the present invention, the pressure offset is a calibration value used to offset the base pressure.

In yet another embodiment of the present invention, the first transmission operating condition includes at least a predetermined engine speed, a predetermined engine torque and a predetermined transmission sump temperature.

In an embodiment of the present invention, the first transmission operating condition includes determining whether a tap-up tap-down mode of the transmission is activated.

In another embodiment of the present invention, the first transmission operating condition includes determining whether the transmission is shifting between the first gear ratio and the second gear ratio.

In yet another embodiment of the present invention, a method of reducing upshift delay in a transmission is provided. The method includes providing a first torque transmitting mechanism that is engageable to achieve a first gear ratio of the transmission and a second torque transmitting mechanism that is engageable to achieve a second gear ratio of the transmission. The method further includes the step of monitoring a first transmission operating condition when the transmission is in the first gear ratio by a controller that is in communication with the first and second torque transmitting mechanisms. The method includes the step of determining if the transmission operating condition has exceeded a threshold operating condition. The method also includes the step of pressurizing an apply chamber of the second torque transmitting mechanism to a first pressure level if the first operating condition has exceeded the threshold operating condition, where the apply chamber is pressurized at the first pressure level to achieve the first engaged position. The apply chamber is pressurized at a second pressure level to achieve a second engaged position, where the first pressure level is less than the second pressure level. The second engaged position achieves the second gear ratio of the transmission.

In an embodiment of the present invention, the method further comprises the step of monitoring the engagement of the first torque transmitting mechanism.

In another embodiment of the present invention, the method further comprises the step of determining if the first torque transmitting mechanism is disengaged.

In yet another embodiment of the present invention, the method further comprises the step of pressuring the apply chamber of the second torque transmitting mechanism to the second pressure level if the first torque transmitting mechanism is disengaged.

In an embodiment of the present invention, the method further comprises the step of providing a return mechanism having a biasing force with the second torque transmitting mechanism. The apply chamber exerts a force that is about equal to the biasing force when the apply chamber is pressurized to the first pressure level.

In another embodiment of the present invention, the method further comprises the step of establishing the first transmission operating condition to include at least a predetermined engine speed, a predetermined engine torque and a predetermined transmission sump temperature.

In yet another embodiment of the present invention, the method further comprises the step of establishing the first transmission operating condition to include detecting whether a tap-up tap-down mode of the transmission is selected.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is an exemplary truth table presenting the state of engagement of the various torque transmitting elements in each of the available forward and reverse speeds or gear ratios of the exemplary transmission shown in FIG. 1;

DETAILED DESCRIPTION

Figure 1:
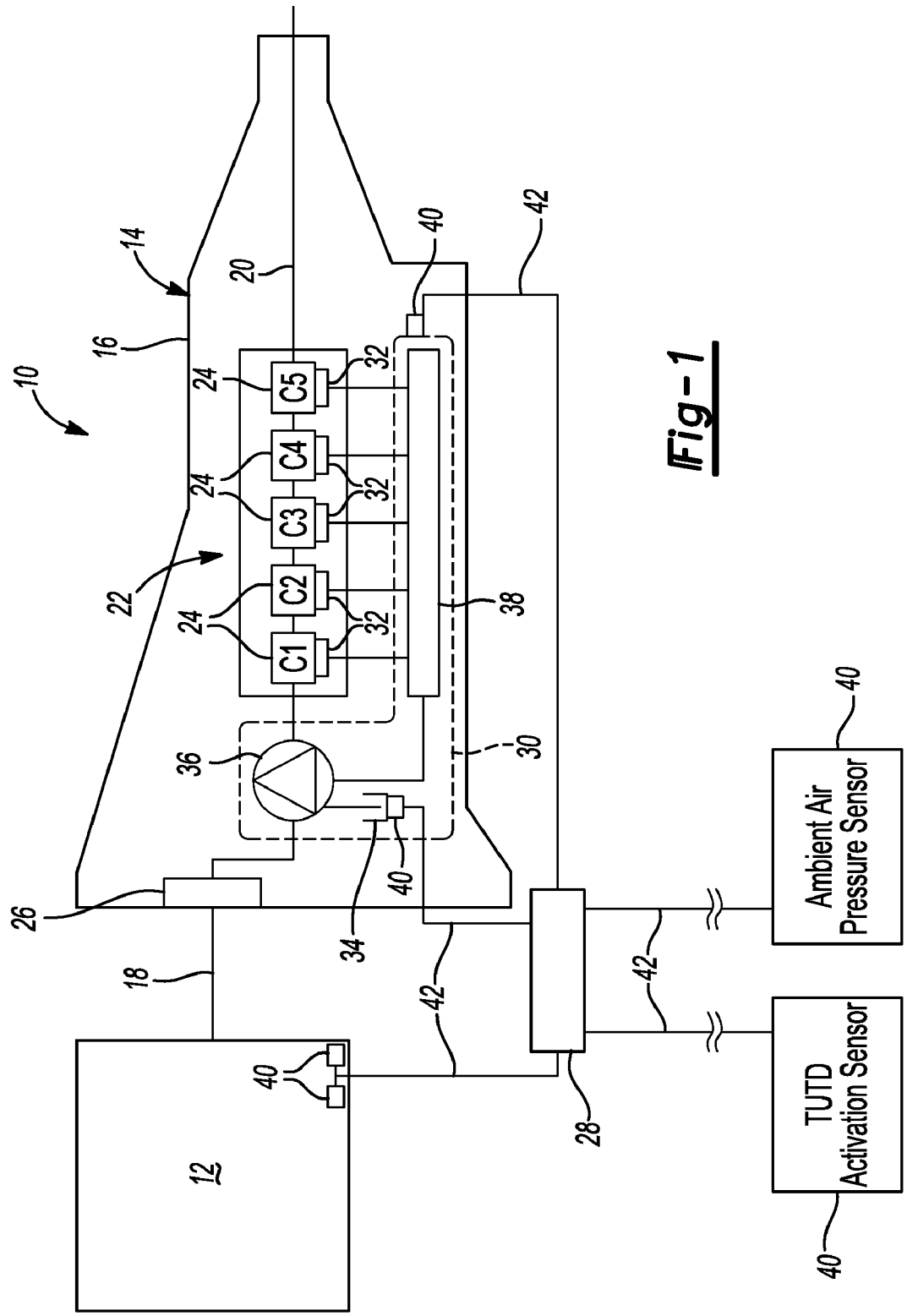
FIG. 1 is an illustration of an exemplary powertrain including an engine and a transmission, where the transmission includes various torque transmitting elements.

The following description is merely exemplary in nature and is not intended to limit the present disclosure, application, or uses. With reference to FIG. 1, an exemplary powertrain is generally indicated by reference number 10. The powertrain includes an engine 12 connected to a transmission 14. The engine 12 may be a conventional internal combustion engine or an electric engine, or any other type of prime mover, without departing from the scope of the present disclosure. If an electric engine, the engine 12 could be located within the transmission 14. The engine 12 supplies a driving torque to the transmission 14.

The transmission 14 includes a typically cast, metal housing 16 which encloses and protects the various components of the transmission 14. The housing 16 includes a variety of apertures, passageways, shoulders and flanges which position and support these components. The transmission 14 includes an input shaft 18, an output shaft 20, and a gear and clutch arrangement 22. In one example, the transmission 14 is a tap-up tap down (TUTD) or manumatic transmission, which allows a driver to manually select a desired gear ratio during driving if a TUTD mode is activated. It should be appreciated that while the transmission 14 is illustrated schematically as a rear wheel drive transmission, the transmission 14 may have other configurations without departing from the scope of the present disclosure.

The input shaft 18 is connected with the engine 12 by a torque converter 26 providing a fluid coupling between the engine 12 and the transmission 14, and receives input torque or power from the engine 12. The output shaft 20 is preferably connected with a final drive unit (not shown) which may include, for example, propshafts, differential assemblies, and drive axles. The input shaft 18 is coupled to and provides drive torque to the gear and clutch arrangement 22.

The gear and clutch arrangement 22 includes a plurality of gear sets and a plurality of shafts, neither of which is shown in detail. The plurality of gear sets may include individual intermeshing gears, such as planetary gear sets, that are connected to or selectively connectable to the plurality of shafts. The plurality of shafts may include layshafts or countershafts, sleeve and center shafts, reverse or idle shafts, or combinations thereof. It should be appreciated that the specific arrangement and number of the gear sets and the specific arrangement and number of the shafts within the transmission 14 may vary without departing from the scope of the present disclosure.

The gear and clutch arrangement 22 further includes at least two torque transmitting mechanisms 24. In the example as shown, five torque transmitting mechanisms 24 are illustrated as C1-C5. The torque transmitting mechanisms 24 are engageable to initiate a gear or speed ratio by selectively coupling individual gears within the plurality of gear sets to individual shafts within the plurality of shafts. Accordingly, the torque transmitting mechanism 24 may be any type of clutch, including wet clutches, rotating clutches, etc., without departing from the scope of the present disclosure.

A control module 28 regulates operation of the transmission 14 based on operating parameters. The control module 28 is preferably an electronic control device having a preprogrammed digital computer or processor, control logic, memory used to store data, and at least one I/O peripheral. The control logic includes a plurality of logic routines for monitoring, manipulating, and generating data. The control module 28 controls the actuation of the torque transmitting mechanisms 24 via a hydraulic control system 30 according to the principles of the present disclosure.

The control module 28 is in communication with a plurality of data links 42 that connect the control module 28 to a plurality of sensors 40 monitoring various parameters of the engine 12, a sump 34 of the transmission 14, and the hydraulic control system 30. The data links 42 may be any type of bidirectional communication interface, such as, for example, a wireless network or data communication lines. The data links 42 connect the control module 28 with the sensors 40 of the engine 12 that monitor the engine speed and the engine torque. The data links 42 also connect the control module 28 with sensors 40 located in the sump 34 that monitor the transmission oil temperature. The data links 42 connect the control module 28 with sensors 40 of the hydraulic control system 30 to monitor the engagement of the torque transmitting mechanisms 24, where engagement of the torque transmitting mechanisms 24 indicate the current gear ratio as well as whether the transmission 14 is in the process of shifting gear ratios. The data links 42 connect the control module 28 with the activation sensor 40 to monitor if the TUTD mode of the transmission 14 is activated. Finally, the data links 42 connect the control module with the ambient air pressure sensor 40 to monitor the ambient air pressure of the vehicle. The ambient air pressure is used to monitor the engine power conditions.

The hydraulic control system 30 is operable to selectively engage each torque transmitting mechanism 24 by selectively communicating a hydraulic fluid to a shift actuating device 32 connected to the corresponding torque transmitting mechanism 24, as will be described in greater detail below. The shift actuating device 32 may be a piston assembly or any other hydraulically actuatable mechanism operable to engage and disengage the torque transmitting mechanism 24 without departing from the scope of the present disclosure. The hydraulic fluid used to actuate the shift actuating device 32 is communicated from the sump 34 under pressure via a pump 36 that is driven by the engine 12 or an auxiliary electric motor. The pump 36 may be of various types, for example, a gear pump, a vane pump, a gerotor pump, or any other positive displacement pump. A valve body 38 having a plurality of valves, solenoids, fluid channels, and other control devices selectively communicates the hydraulic fluid from the pump 36 to the shift actuating device 32 in order to engage or disengage the torque transmitting mechanism 24.

Turning to FIG. 2, an exemplary truth table presenting the various combinations of torque-transmitting mechanisms 24 that are activated or engaged to achieve the various gear ratios is provided. It should be appreciated that these configurations are exemplary only, and that other combinations of torque-transmitting mechanisms 24 can be used as well. In the embodiment as shown, two torque transmitting mechanisms 24 are used for any gear with the exception of the neutral position. For example, the first forward speed ratio is achieved by engaging clutches C1 and C5. Shifting from one forward speed to another is generally achieved by disengaging an off-going clutch while engaging an on-coming clutch. For example, the transmission 14 upshifts from first to second gear by disengaging clutch C5 while engaging clutch C4.

Figure 3:
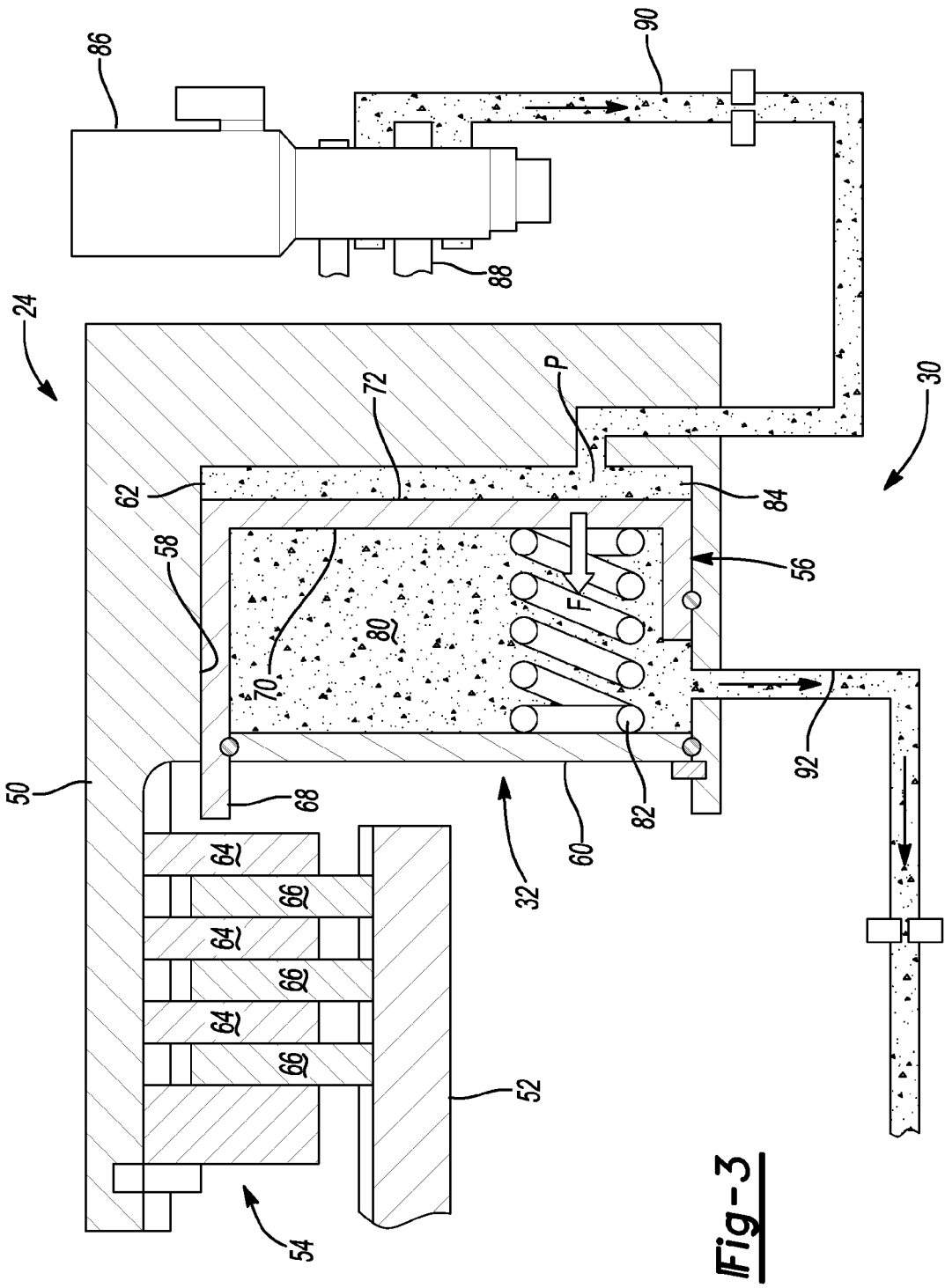
FIG. 3 is an illustration of one of the torque transmission mechanisms of the transmission illustrated in FIG. 1.

With reference to FIG. 3, a top-half of one of the torque transmitting mechanisms 24 is shown. In the example provided the torque transmitting mechanism 24 is a multiple disc type clutch. It should be appreciated that the torque transmitting mechanism 24 is exemplary only, and that various configurations of torque transmitting mechanism may be employed with the present disclosure. The torque transmitting mechanism 24 generally includes a housing 50, a hub 52, a clutch pack 54, and the shift actuating device 32. The housing 50 is preferably annular and includes an inner surface 58 and a backing plate 60. The inner surface 58 and the backing plate 60 cooperate to define a central space or cavity 62 within the housing 50.

The clutch pack 54 is located radially inward of the housing 50 and includes a first set of reaction discs or apply plates 64 interleaved with a second set of reaction discs or friction plates 66. The shift actuating device 32 includes an actuator 56 that is slidably disposed within the central cavity 62. The actuator 56 includes a piston arm 68 that extends through the backing plate 60 out of the central cavity 62. A first surface 70 is located on a side of the actuator 56 opposite that of a second surface 72. The first surface 70 and the backing plate 60 cooperate to define a dam space 80. The second surface 72 and the inner surface 58 of the housing 50 cooperate to define an apply chamber 84.

The actuator 56 is axially moveable within the cavity 62 between an unengaged position, a partially first engaged position, and a fully second engaged position. FIG. 3 illustrates the actuator in an unengaged position. A biasing member 82 is located within the dam space 80 between the backing plate 60 and the actuator 56. The biasing member 82 biases the actuator 56 into the unengaged position. The biasing member 82 may take various forms, such as, for example, a coil spring.

Engagement of the torque transmitting mechanism 24 is controlled by the hydraulic control system 30 (also shown in FIG. 1). For example, in the embodiment as illustrated, the valve body 38 (shown in FIG. 1) includes a valve assembly 86 in communication with a supply line or channel 88 and a fluid communication channel 90. The supply line 88 is in fluid communication with the pump system 36 (FIG. 1) and delivers a pressurized fluid flow to the valve assembly 86. The pressurized fluid flow may include any hydraulic fluid, such as, for example, oil. The valve assembly 86 is operable to selectively allow the pressurized fluid flow delivered from the supply channel 88 to communicate through the valve assembly 86 into the fluid channel 90. The fluid channel 90 is in fluid communication with the apply chamber 84.

During operation, the hydraulic control system 30 actuates the torque transmitting mechanism 24 by using the pressurized fluid flow to actuate the actuator 56. For example, to engage the torque transmitting mechanism 24, the valve 86 opens and permits the pressurized fluid flow to communicate through the valve 86, through the fluid communication channel 90, and into the apply chamber 84. The apply chamber 84 is filled with a predetermined amount of fluid and is pressurized to a pressure P. The pressurized fluid in the apply space 84 moves the actuator 56 against the biasing member 82 in a direction F towards the engaged position.

When the actuator 56 is in the unengaged position, the reaction discs 64, 66 are not frictionally coupled and therefore torque is not transmitted between the housing 50 and the hub 52. When the actuator 56 is in the first engaged position, the pressure P of the apply space 84 is pressurized to a first pressure level, where the force F exerted by the pressure P located in the apply chamber 84 is about equal to an opposing force exerted by the biasing mechanism 82. The piston arm 68 is moved towards the clutch pack 54 by the actuator 56 such that the piston arm 56 engages the clutch pack 54. The reaction discs 64, 66 are moved axially and partially engage one another at a relatively low torque when compared to full engagement of the clutch pack 54. When partially engaged, the discs 64, 66 tend to drag or slip against one another. However, torque is still transmitted between the housing 50 and the hub 52 though the clutch pack 54 when the actuator 56 is in the first engaged position.

When the actuator 56 is in the second engaged position, the pressure P of the apply chamber 84 is pressurized to a second pressure level, where the second pressure level is greater than the first pressure level. When in the second engaged position, the force F exerted by the pressure P of the apply chamber 84 is greater than the force exerted by the biasing mechanism 82. The piston arm 68 is moved towards the clutch pack 54 by the actuator 56 such that the piston arm 56 completely engages the clutch pack 54, and the reaction discs 64, 66 move axially and substantially engage one another. When in the engaged position, there is only a negligible amount of slipping between the discs 64, 66.

As the actuator 18 is urged into either of the first engaged position or the second engaged position, the dam space 80 decreases in volume while the apply space 84 increases in volume. Accordingly, as the volume of the dam space 80 decreases, the hydraulic fluid located within the dam space 80 is urged out into a second fluid communication channel 92.

Figure 4:
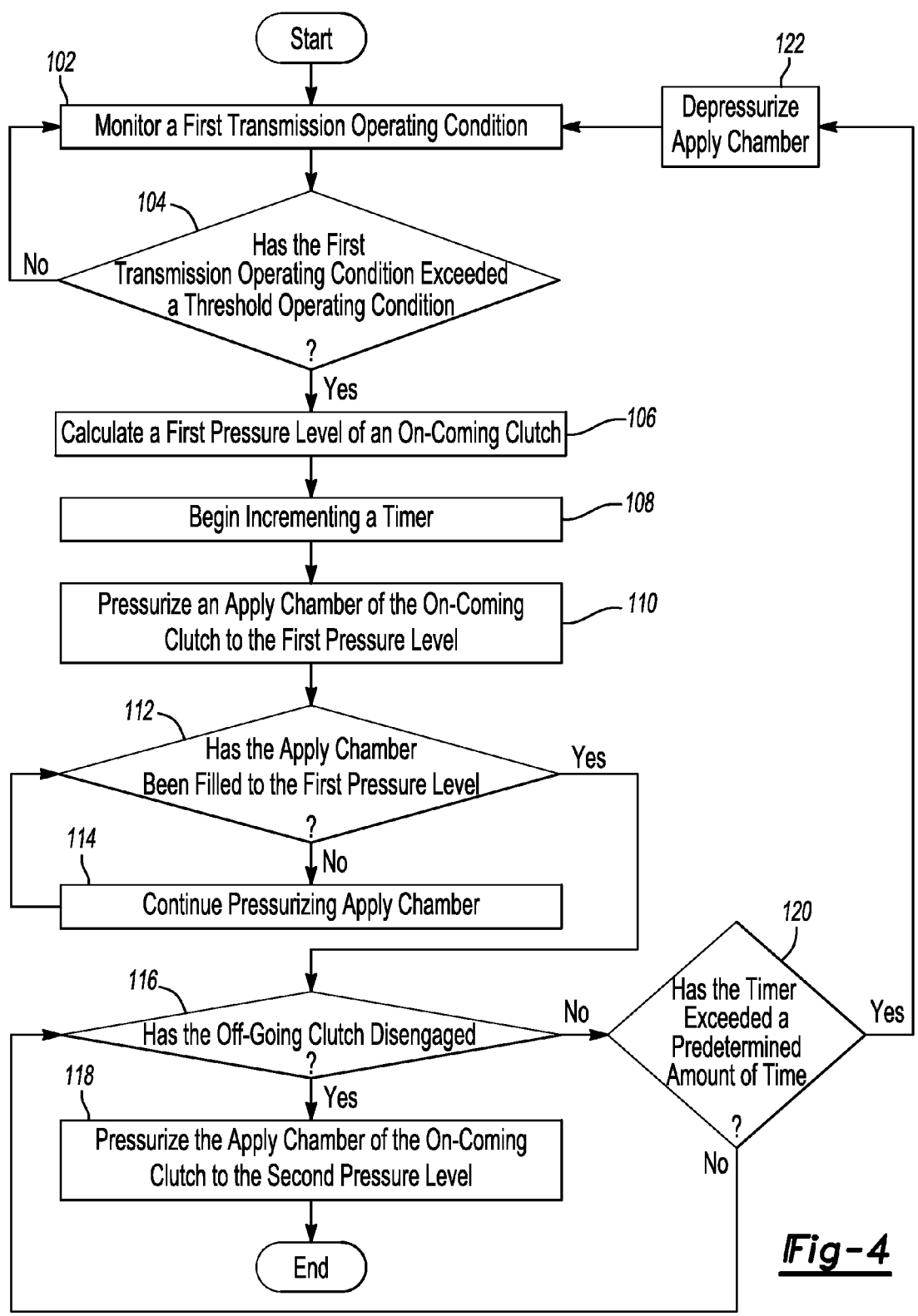
FIG. 4 is a flow diagram illustrating a method for controlling the transmission.

Turning now to FIG. 4, and with continued reference to FIGS. 1-3, a method for controlling the transmission 14 during an upshift from a lower gear ratio to a higher gear ratio is generally indicated by reference number 100. The method 100 begins at step 102 where the control module 28 includes a control logic for monitoring various vehicle parameters that are indicative of a first transmission operating condition.

The various parameters of the first transmission operating condition include, but are not limited to, the engine speed and the engine torque sensed by sensors 40 from the engine 12 as well as the transmission sump temperature sensed by the sensor 40 in the sump 34. In one example, the parameters of the first transmission operating condition also include the current gear ratio as well as whether the transmission 14 is in the process of shifting gear ratios. The first transmission operating condition may also include monitoring if the TUTD mode of the transmission 14 is activated, and the ambient air pressure. The method 100 then proceeds to step 104.

In step 104, the control module 28 includes a control logic for determining if the first transmission operating condition has exceeded a threshold operating condition. The threshold operating condition represents the operating conditions where the transmission 14 is about to upshift to a higher gear ratio. The threshold operating condition is less than a gear ratio operating limit. The gear ratio operating limit is defined as the operating conditions of the transmission 14 that, when exceeded, demands that the controller 28 upshifts the transmission 14 to a higher gear ratio. In one example, the threshold operating condition includes a predetermined value of the engine speed, the engine torque and the transmission sump temperature. If the engine speed, the engine torque, and the transmission sump temperature in the first transmission operating condition have exceeded the respective predetermined values in the threshold operating condition, then the method 100 proceeds to step 106. However, if the engine speed, the engine torque, and the transmission sump temperature have not exceeded the respective predetermined values, then the method 100 returns to step 102, and the control module 28 continues monitoring the transmission operating conditions.

In one example, the threshold operating conditions include a requirement that the transmission 14 is not in the process of shifting gear ratios. If the control logic of the control module 28 determines that the first transmission operating conditions indicate that the transmission 14 is in the process of shifting to another gear ratio, the threshold operating conditions have not been exceeded and the process 100 returns to step 102. Additionally, the threshold operating condition may also include a requirement that the TUTD mode of the transmission 14 is activated. If the control logic of the control module 28 determines that the TUTD mode of the transmission 14 has not been activated, then the threshold condition has not been exceeded and method 100 returns to step 102. If the TUTD mode of the transmission 14 is activated, then the method 100 then proceeds to step 106. The threshold operating condition may also include a requirement that the ambient air pressure is above a predetermined pressure. If the ambient air pressure is below the predetermined value, then the threshold value has not been exceeded and method 100 returns to step 102. This protects against low engine power conditions. If the ambient air pressure is above the predetermined value then the threshold value is exceeded and method 100 proceeds to step 106.

In step 106, the control module 28 includes a control logic for calculating the first pressure level of an on-coming torque transmitting mechanism 24 to be in the first engaged position. The on-coming torque transmitting mechanism 24 is the torque transmitting mechanism engaged in the next higher gear ratio. For example, referring to FIG. 2, if the transmission 14 is in the first gear ratio, then the on-coming torque transmitting mechanism 24 is C4.

The pressure P of the apply chamber 84 is calculated by the control module 28, where a base pressure of the apply chamber 84 is multiplied by a weighting factor. A pressure offset value is added to the product of the base pressure and the weighting factor. The base pressure of the apply chamber 84 is a learned value that is calculated during either closed-throttle downshift (CT) or lift foot upshift (LFU) of the transmission 14. Closed-throttle (CT) downshifting generally occurs during coast or braking conditions where the engine throttle is substantially closed. Lift foot upshift (LFU) generally occurs when the transmission 14 is shifted to a higher gear ratio when an accelerator pedal is released. For example, if an accelerator pedal is released when driving in a third gear ratio, shifting into a fourth speed is performed. If the accelerator pedal is again depressed, shifting is performed back into the third gear ratio. Because the base pressure value is calculated using a closed-throttle downshift or a lift foot upshift, the control logic of the control module 28 adapts to transmission variation that may occur during the operating life of the transmission 14.

The weighing factor is a calibration value used to scale the base pressure due to the differences in pressurized fluid flow in the fluid communication channel 90. The weighing factor is a value that is used to multiply the base pressure value. The pressure offset is a calibration value used to offset the base pressure due to the differences in pressurized fluid flow in the fluid communication channel 90. The difference in pressurized fluid flow is the difference in pressure in the fluid communication channel 90 due to any number of reasons such as, for example, manufacturing variances that occur between different vehicles, or changes in pressure that occur during the operating life of the transmission 14.

The first pressure level may vary between each of the torques transmitting mechanisms 24. For example, each of the torque transmitting mechanisms C1-C5 have a specific first pressure level. Referring to FIG. 2, the torque transmitting mechanisms C1 and C5 do not include a first pressure level, as the transmission 14 is not upshifted such that the on-coming clutch would be either the torque transmitting mechanism C1 or C5.

The first pressure level of the torque transmitting mechanisms C2-C4 are each calculated based on the base pressure value, the weighting factor and the pressure offset for the specific torque transmitting mechanism. For example, torque transmitting mechanism C2 is calculated based on the base pressure value calculated during lift foot upshift between the third and fourth gear ratio (LFU 34). The lift foot upshift between third and fourth gear (LFU 34) occurs as the transmission is shifted from the third gear ratio to the fourth gear ratio when the accelerator pedal is released. The base pressure value based on LFU 34 is multiplied by a weighing factor based on difference in pressurized fluid flow in the fluid communication channel 90 of torque transmitting mechanism C2. The product of the base pressure value and the weighing factor are added to the pressure offset of torque transmitting mechanism C2 to calculate the first pressure level of the torque transmitting mechanism C2. The pressure offset is based on the differences in pressurized fluid flow in the fluid communication channel 90 of torque transmitting mechanism C2.

The torque transmitting mechanism C3 includes a base pressure value calculated during closed throttle downshift between the fourth gear ratio to the third gear ratio (CT 43). The base pressure value based on CT 43 is multiplied by a weighing factor based on difference in pressurized fluid flow in the fluid communication channel 90 of torque transmitting mechanism C3. The product of the base pressure value and the weighing factor are added to the pressure offset of torque transmitting mechanism C3 to calculate the first pressure level of the torque transmitting mechanism C3. The pressure offset is based on the differences in pressurized fluid flow in the fluid communication channel 90 of torque transmitting mechanism C3.

The torque transmitting mechanism C4 includes a base pressure value calculated during closed throttle downshift between the third gear ratio to the second gear ratio (CT 32). The base pressure value based on CT 32 is multiplied by a weighing factor based on difference in pressurized fluid flow in the fluid communication channel 90 of torque transmitting mechanism C4. The product of the base pressure value and the weighing factor are added to the pressure offset of torque transmitting mechanism C4 to calculate the first pressure level of the torque transmitting mechanism C4. The pressure offset is based on the differences in pressurized fluid flow in the fluid communication channel 90 of torque transmitting mechanism C4. Once the apply chamber 84 of an oncoming torque transmitting mechanism 24 is pressurized to the first pressure level, the method 100 may then proceed to step 108.

In step 108, the control module 28 includes a control logic for incrementing a timer. The timer is used as a backup in the event the transmission 14 does not complete an upshift within a predetermined amount of time. The timer is a digital counter that increments at a fixed frequency and creates an interrupt in a processor of the control module 28 when the timer reaches a predetermined value. A more detailed method of determining if the predetermined amount of time has expired is discussed below. Method 100 may then proceed to step 110.

In step 110, the control module 28 includes a control logic for pressurizing the apply chamber 84 of the on-coming torque transmitting mechanism 24 to the first pressure level that was calculated in step 106. This will move the on-coming torque transmitting mechanism 24 to the first engaged position, while still maintaining engagement of the off-going torque transmitting mechanisms 24. Referring to FIG. 3, the first pressure level is achieved by pressurizing the apply chamber 84 of the on-coming torque transmitting mechanism 24 to the first pressure level. When in the first engaged position, the force F exerted by the pressure P in the apply chamber 84 is about equal to a force exerted by the biasing mechanism 82. The reaction discs 64, 66 of the clutch pack 54 move axially to partially engage one another at a relatively low torque, where the discs 64, 66 tend to drag or slip against one another.

Pressurizing the apply space 84 of the on-coming torque transmitting mechanism 24 to the first pressure level partially engages of the clutch pack 54. Partially engaging the clutch pack 54 of the on-coming clutch before the transmission 14 shifts to the next higher ratio generally reduces the upshift delay experienced in the transmission 14. This is because the time to pressurize the apply chamber 84 to the second pressure level is reduced, as the apply chamber 84 is already partially filled with fluid.

During partial engagement, the reaction discs 64, 66 tend to drag or slip against one another, which may generate some heat. However, the threshold operating condition is set such that the on-coming clutch only remains partially engaged for a relatively short period of time before the transmission upshifts, and the on-coming clutch fully engages. Therefore, the torque transmitting mechanisms 24 may not need to include high energy clutch material to accommodate high levels of heat generation. The increment timer discussed in step 108 also acts as a backup, where the apply chamber 84 may be depressurized after a predetermined amount of time if the apply chamber 84 is not pressurized to the second pressure level (i.e. the transmission 14 does not complete an upshift within the predetermined amount of time). Method 100 may proceed to step 112 if the timer discussed in step 108 is included. However, in an alternative embodiment, if a timer is not included, then method 100 may proceed directly to step 116.

In step 112, the control module 28 includes control logic for determining if the apply chamber 84 of the on-coming torque transmitting device 24 has been pressurized to the first pressure level. If the apply chamber 84 has been pressurized to the first pressure level, then the method proceeds to step 116. However, if the apply chamber 84 is not at the first pressure level, then the method 100 proceeds to step 114, where the apply chamber 84 continues to be pressurized. Method 100 remains at steps 112 and 114 until the apply chamber 84 is pressurized to the first pressure level. Once the apply chamber 84 is pressured to the first pressure level, method 100 proceeds to step 116.

In step 116, the control module 28 includes a control logic for monitoring the engagement of the off-going torque transmitting mechanism 24 associated with the current gear ratio. For example, referring to FIG. 2, if the transmission 14 is operating in the first gear ratio, then the control module 28 monitors the engagement of torque transmitting mechanism C5. The torque transmitting mechanism C5 is the off-going clutch that is disengaged as the transmission 14 upshifts to the second gear ratio. The control module 28 continuously monitors engagement of the off-going clutch C5 until the off-going C5 disengages. Once the off-going clutch C5 is disengaged, method 100 proceeds directly to step 118. However, if the off-going clutch has not disengaged, then process 100 may proceed to step 120, which is an optional step that is performed if the timer discussed in step 108 is included.

In step 120, the control module 28 includes control logic for determining if the predetermined amount of time has been exceeded by the incrementing timer. The predetermined amount of time represents the period of time that the on-coming clutch can remain partially engaged without causing damage to the clutch pack 54. The on-coming clutch only remains partially engaged for a limited amount of time such that a significant amount of heat can not be generated as the discs 64, 66 slip against one another.

If the predetermined amount of time has been exceeded by the incrementing timer, then method 100 proceeds to step 122, where the apply chamber 84 is depressurized such that the respective torque transmitting device 24 is disengaged. Then, after the apply chamber 84 is depressurized, method 100 proceeds back to step 102, where the first operating transmission is monitored. However, if the predetermined amount of time has not been exceeded, then method 100 proceeds back to step 116, where the timer continues to be incremented, and the control logic continues to monitor the off-going clutch. Method 100 remains at steps 116 and 120 until either the off-going clutch is disengaged, or if the predetermined time is exceeded. Once the off-going clutch is disengaged, method 100 proceeds to step 118.

In step 118, the control module 28 includes a control logic for pressurizing the apply chamber 84 of the on-coming torque transmitting mechanism 24 from the first pressure level to the second pressure level. The on-coming torque transmitting mechanism 24 is in the second engaged position when the apply chamber 84 is pressurized to the second pressure level. Engaging the on-coming torque transmitting mechanism 24 to the second engaged position will upshift the transmission 14 to the next gear ratio. For example, referring to FIG. 2, if the transmission 14 upshifts from the first gear ration to the second gear ratio, then the apply chamber 84 of torque transmitting mechanism C4 is pressurized to the second pressure level. Once the transmission 14 has upshifted to the higher ratio, method 100 may then terminate.

Partially engaging the on-coming clutch before the transmission 14 shifts to the next higher ratio generally reduces the upshift delay experienced. During partial engagement of the clutch, the reaction discs may drag or slip against one another. However, the threshold operating condition is set such that the on-coming clutch only remains partially engaged for a relatively short period of time before the transmission upshifts and the on-coming clutch fully engages. Therefore, the torque transmitting mechanisms 24 may not need to include high energy clutch material to accommodate high levels of heat generation. The increment timer discussed also acts as a backup, in the event the transmission 14 does not complete an upshift within the predetermined amount of time.

The description of the invention is merely exemplary in nature and variations that do not depart from the gist of the invention are intended to be within the scope of the invention. Such variations are not to be regarded as a departure from the spirit and scope of the invention.

What is claimed is:

1. A system for controlling a transmission, comprising:
a first torque transmitting mechanism that is engageable to achieve a first gear ratio of the transmission;
a second torque transmitting mechanism having an apply chamber, wherein the apply chamber is pressurized at a first pressure level to achieve a first engaged position and is pressurized at a second pressure level to achieve a second engaged position where the first pressure level is less than the second pressure level, and wherein the second engaged position achieves a second gear ratio of the transmission;
a controller in communication with the first and second torque transmitting mechanisms, wherein the controller includes:
a first control logic for monitoring a first transmission operating condition when the transmission is in the first gear ratio;
a second control logic for determining if the transmission operating condition has exceeded a threshold operating condition;
a third control logic for pressurizing the apply chamber of the second torque transmitting mechanism to the first pressure level if the first operating condition has exceeded the threshold operating condition;
a fourth control logic for monitoring the engagement of the first torque transmitting mechanism; and
a fifth control logic for determining if the first torque transmitting mechanism is disengaged.

2. The system of claim 1 wherein the controller includes a sixth control logic for pressuring the apply chamber of the second torque transmitting mechanism to the second pressure level if the first torque transmitting mechanism is disengaged.

3. The system of claim 1 wherein the controller includes a control logic for a timer, wherein the timer depressurizes the apply chamber of the second torque transmitting mechanism from the first pressure level if a predetermined amount of time has been exceeded and the first torque transmitting device is not disengaged.

4. The system of claim 1 wherein the second torque transmitting mechanism includes a return mechanism having a biasing force, and wherein the apply chamber exerts a force that is about equal to the biasing force when the apply chamber is pressurized to the first pressure level.

5. The system of claim 1 wherein the first pressure level is a base pressure of the apply chamber that is multiplied by a weighing factor, and wherein a pressure offset value is added to the product of the base pressure and the weighing factor.

6. The system of claim 5 wherein the base pressure is a learned value that is calculated during one of a closed throttle downshift and a lift foot upshift of the transmission.

7. The system of claim 5 wherein the weighing factor is a calibration value used to scale the base pressure.

8. The system of claim 5 wherein the pressure offset is a calibration value used to offset the base pressure.

9. The system of claim 5 wherein the first transmission operating condition includes at least an engine speed, an engine torque, and a transmission sump temperature, and wherein the threshold operating condition includes at least a predetermined engine speed, a predetermined engine torque and a predetermined transmission sump temperature.

10. The system of claim 9 wherein the first transmission operating condition does not exceed the threshold operating condition if a tap-up tap-down mode of the transmission is not activated.

11. The system of claim 9 wherein the first transmission operating condition does not exceed the threshold operating condition if the transmission is shifting between the first gear ratio and the second gear ratio.

12. A method of reducing upshift delay in a transmission, the transmission including a first torque transmitting mechanism that is engageable to achieve a first gear ratio of the transmission and a second torque transmitting mechanism that is engageable to achieve a second gear ratio of the transmission, comprising:
monitoring a first transmission operating condition when the transmission is in the first gear ratio;
determining if the transmission operating condition has exceeded a threshold operating condition;
pressurizing an apply chamber of the second torque transmitting mechanism to a first pressure level if the first operating condition has exceeded the threshold operating condition, where the apply chamber is pressurized at the first pressure level to achieve a first engaged position;
monitoring the engagement of the first torque transmitting mechanism; and
determining if the first torque transmitting mechanism is disengaged, and
wherein the apply chamber includes a second pressure level to achieve a second engaged position, where the first pressure level is less than the second pressure level, and the second engaged position achieves the second gear ratio of the transmission.

13. The method of claim 12 further comprising the step of pressurizing the apply chamber of the second torque transmitting mechanism to the second pressure level if the first torque transmitting mechanism is disengaged.

14. The method of claim 12 further comprising the step of including a return mechanism having a biasing force with the second torque transmitting mechanism, and wherein the apply chamber exerts a force that is about equal to the biasing force when the apply chamber is pressurized to the first pressure level.

15. The method of claim 12 further comprising the step of establishing the threshold operating condition to include at least a predetermined engine speed, a predetermined engine torque and a predetermined transmission sump temperature.

16. The method of claim 15 further comprising the step of establishing the first transmission operating condition not to exceed the threshold operating condition if a tap-up tap-down mode of the transmission is not selected.

* * * * *